TONE ARM CONTROL MECHANISM

Filed March 29, 1949 4 Sheets-Sheet 1

INVENTOR.
Barton A. Proctor

BY

Moses, Nolte, Crews & Berry
ATTORNEYS

INVENTOR.
Barton A. Proctor
BY
Mosen, Nolte, Crews & Berry
ATTORNEYS

INVENTOR.
Barton A. Proctor
BY
Moses, Nolte, Crews & Berry
ATTORNEYS

Nov. 2, 1954 B. A. PROCTOR 2,693,363

TONE ARM CONTROL MECHANISM

Filed March 29, 1949 4 Sheets-Sheet 4

INVENTOR.
Barton A. Proctor
BY
Moses, Nolte, Crewe & Berry
ATTORNEYS 2,693,363

TONE ARM CONTROL MECHANISM

Barton A. Proctor, Larchmont, N. Y., assignor, by direct and mesne assignments, of eighteen one-hundredths to Sarah Elizabeth Proctor, eighteen one-hundredths to Robert Clendenin Proctor, eighteen one-hundredths to Barton Allen Proctor, Jr., all of Larchmont, N. Y., and ten one-hundredths to Albert C. Nolte, Plandome, N. Y.

Application March 29, 1949, Serial No. 84,220

1 Claim. (Cl. 274—23)

This invention relates to phonographs, and particularly to the tone arms of phonographs.

One feature of the present invention has to do with a tone arm which is adapted for a wide variety of uses. The tone arm, which is desirably pivotally supported intermediate its ends upon a horizontally movable bracket, is adapted to receive in its outer end a translating device in the form of an insertable cartridge.

The stylus pressure which is desired varies for different classes of service, so that adjustable mechanism for determining and indicating the stylus pressure is highly desirable.

It is accordingly an object of the present invention to provide a counterbalancing spring connected to the arm, and mechanism carried by the bracket and adjustable to vary the tension of the spring so as to provide a desired stylus pressure.

It is a further object of the invention to provide an operating connection between the indicator and the spring which includes means for relatively adjusting the indicator and the spring to bring the stylus pressure into conformity with the scale reading. By this means inaccuracies of scale reading, which would otherwise be introduced by the varying weights of cartridges and tone arms are overcome.

In modern phonograph practice the recording density measured in lines per inch has been increased again and again until now it is feasible to employ a recording density as high as three hundred lines per inch. When the higher recording densities are employed, there is great likelihood that a person in attempting to set the stylus down upon a rotating record or to lift it off of such a record will impart to the stylus a sufficient horizontal component of movement to cause it to cut across the lines of recording, and thereby to damage the record.

For the purpose of obviating such faulty use of the equipment, there is provided in accordance with the present invention a stylus lifting device mechanically operable in a vertical direction to engage and depress the inner end of the tone arm without imparting any horizontal component of movement to it.

It is a further feature that the stylus lifting mechanism referred to includes a depressible member having a portion of wide angular extent which is adapted to overlie the inner end of the tone arm throughout the operating range of movement thereof. The depressible member is desirably spring urged away from engagement with the tone arm, and is manually operated through a two position cam, the cam being constructed and arranged to hold the member depressed against the action of the spring.

Other objects and advantages will hereinafter appear.

In the drawing forming part of this specification

Figures 1, 2:
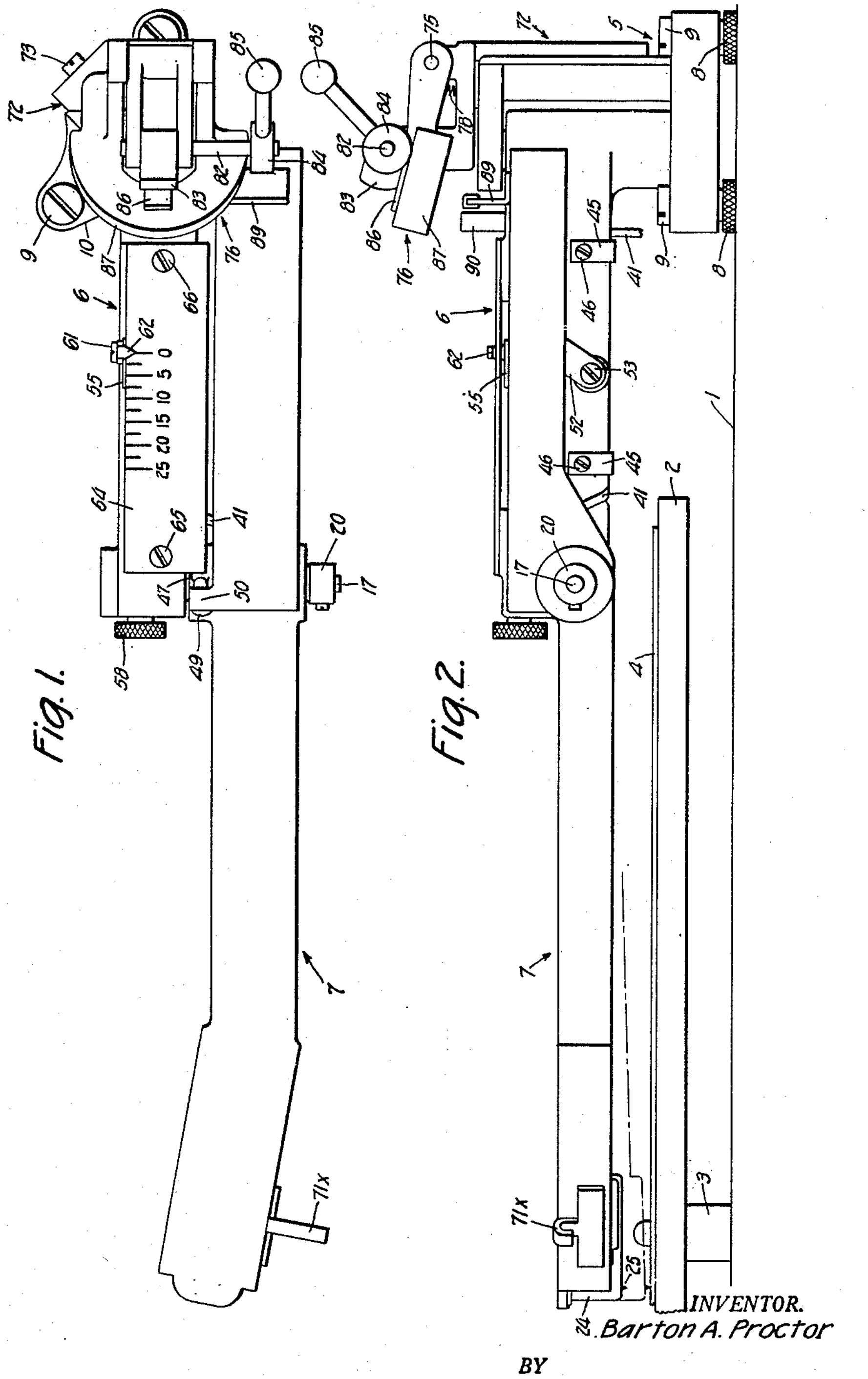
Fig. 1 is a plan view of a phonograph tone arm and associated mechanism embodying features of the invention.
Fig. 2 is a fragmentary view in side elevation showing the mechanism of Fig. 1 in association with a phonograph turntable and record.

All of the phonograph mechanism illustrated is supported upon a frame or casing member 1, with the exception of the turntable 2, the turntable shaft 3, and the record 4. Briefly, a stationary bracket 5 pivotally supports a bracket 6 for horizontal movement, and the bracket 6 in turn pivotally supports a tone arm 7 for vertical movement.

The bracket 5 has three hollow screws 8 threaded into it from below. The heads of these screws constitute feet upon which the structure rests. The screws are adapted to be adjusted in order to adjust the level of the bracket 5. Holddown screws 9 are passed freely downward through the hollow screws 8 and are threaded into the frame member 1. When adjustment of the bracket 5 is desired, the screws 9 are backed out short distances and the screws 8 are then adjusted. After the desired level condition has been secured, the screws 9 are again tightened.

The bracket 5 includes upper and lower horizontal portions 10 and 11 in which conical bearing members 12 and 13 are secured. A stationary vertical shaft 14 extends through the conical bearing members 13 and is secured to them. The bracket 6 has secured in it ball bearings 15 and 16 which cooperate, respectively, with the conical bearing members 12 and 13.

The bracket 6 has a horizontal shaft 17 secured to it by a pin 18. The shaft 17 extends laterally beyond the bracket 6 and has secured upon it a pair of conical bearings 19 and 20. Ball bearings 21 and 22 secured in the arm 7 cooperate with the ball bearings 19 and 20, respectively.

The outer end of the arm 7 is formed as a hollow channel adapted to receive a translating device 23 in the form of a cartridge. The translating device 23 includes a body 24 which carries a record engaging stylus 25. The body 24 is engaged at the top and along both sides by a U-shaped clip 26, the arms of which are formed with arcuate bulging portions 27 for engaging in angular side channels 28 of the arm 7. The arms of the clip 26 can be squeezed inward to free the clip for movement along the arm. When the clip arms are allowed to spring apart the bulging portions bear firmly against the walls of the side channels 28.

The body 24 is provided with inwardly projecting contacts 29 and 30 which are connected through conductors 31 and 32, respectively, to contacts 33 and 34. The contacts 33 and 34 are mounted in a terminal block 35, which is secured to the lower face of a tail portion of the clip 26. Insertion of the cartridge into the arm is limited by engagement of the clip 26 and the terminal block 35 with a stationary terminal block 36 which is secured to the arm 7.

The block 36 has affixed to its lower face contacts 37 and 38 in the form of flat, metallic strips. The contacts 33 and 34 are bent as shown, and are urged with spring pressure into engagement with the respective stationary contacts 37 and 38. Conductors 39 and 40 contained in a common insulating sheath 41 extend inwardly along the channeled portion of the arm 7, over the shaft 17, and out through an opening 42 formed in the side wall of the arm 7 which is adjacent to the bracket 6. The conductor containing sheath 41 is led thence through a notch 43 of the bracket 6 into a channel 44 formed in the bottom of the bracket, being supported in the channel by a bent finger 45 which is secured to the side of the bracket by a screw 46. At a point near the vertical shaft 14 the sheath 41 with the contained conductors is turned downward away from the bracket 6 and extended through the frame member 1 for connection of its conductors to appropriate terminals located beneath the member 1.

The construction described enables cartridges of different characters to be readily employed in connection with the tone arm illustrated.

The tone arm with the cartridge 23 inserted is out of balance, the outer end of the arm with the cartridge overbalancing the inner end of the arm. A counterbalancing spring 47 is connected to the arm both to compensate for variations of parts and to provide different desired operating pressures of styluses.

The counterbalancing spring 47 has its outer end passed through a hole 48 formed in the inner end of a headed pin 49, the pin being passed rearwardly through an ear 50 of the arm 7. The inner end of the spring 47 is connected to a pin 51 fast upon a lever 52. The lever 52 is supported upon a pivot screw 53 which is threaded into a projection 53x of the bracket 6.

The lever 52 is connected through a link 54 with a slide block 55 which is mounted for sliding movement in a recess 56 of the bracket 6, the block having a flat lower face which runs in engagement with the flat face of the recess. A screw 57 having a knurled head 58 is passed into the recess 56 through the outer end of the bracket 6 and is threaded through the block 55.

The head 58 fast upon the screw 57 includes a boss portion 59 which bears against the outer end of the bracket 6. A nut 60 threaded onto the screw and fixed in place engages the forward boundary wall of the recess 56. The screw extends freely through a bore 61 of the bracket 6 between the boss 59 and the nut 60. The boss 59 and the nut 60 fix the screw 57 against longitudinal movement, but do not interfere with rotation of the screw.

The block 55 has a pointer 62 secured to it by a screw 63. The pointer extends upward along one side of the block and is bent at right-angles to overlie a scale plate 64. The scale plate 64 is secured on top of the bracket 6 by means of screws 65 and 66. The scale plate may be graduated in any suitable units or simply in an arbitrary manner so long as the readings convey desired information to the user of the machine. In the illustrative embodiment the scale is graduated in terms of grams of pressure exerted by the stylus upon the record. The screw 57 is simply operated back and forth by rotation of its knurled head 58 to locate the pointer at any desired scale reading, and, subject to a preliminary permanent adjustment which will now be explained, the pressure of the stylus in grams will be indicated by the scale reading of the pointer.

The preliminary adjustment referred to has to do with the securement of balance when the pointer is adjusted to the zero mark on the scale.

Figures 3, 4, 5:
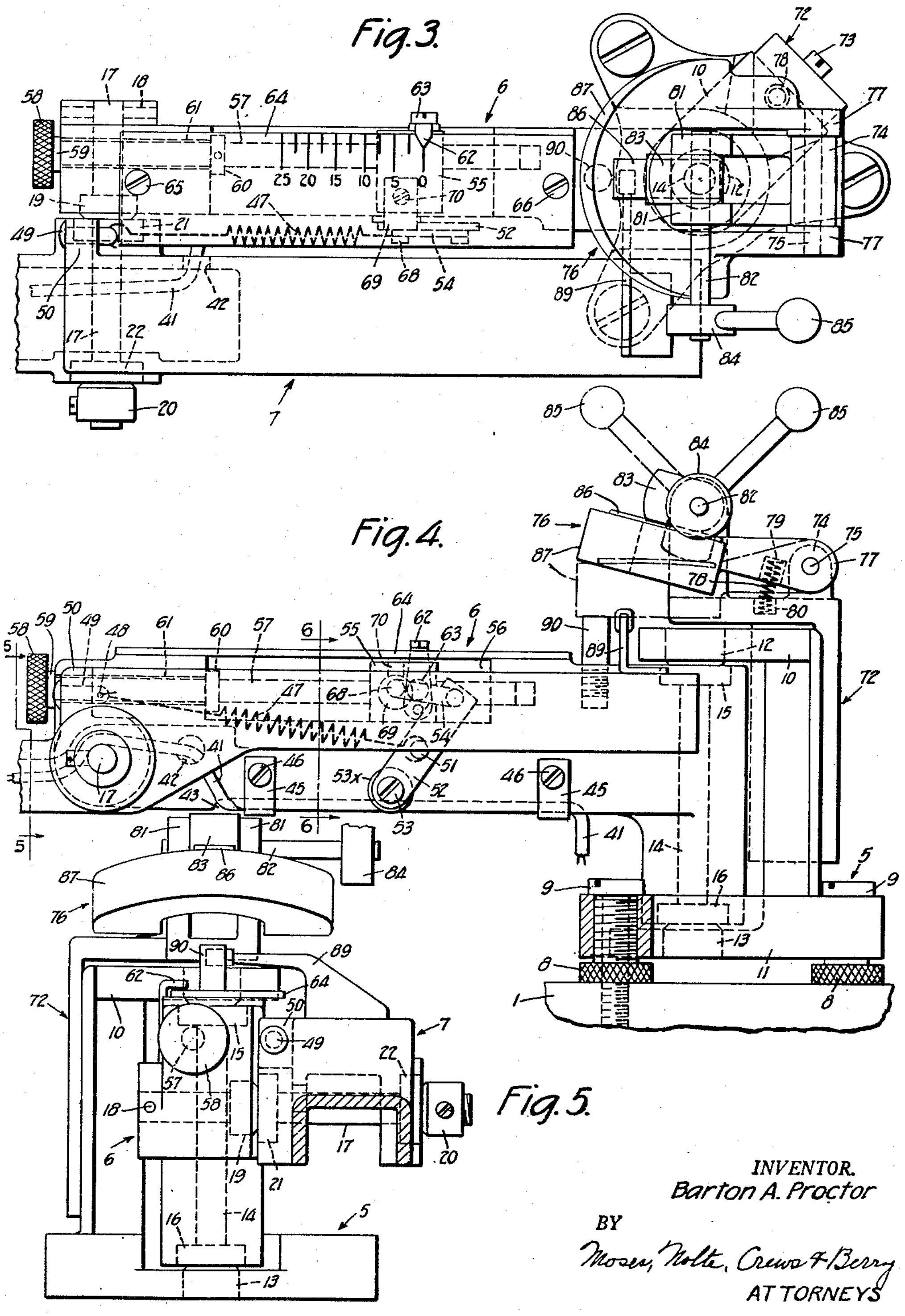
Fig. 3 is a fragmentary plan view upon a larger scale than Figs. 1 and 2 showing a portion of the mechanism of Fig. 1, but in greater detail than Fig. 1.
Fig. 4 is a fragmentary view in side elevation corresponding to Fig. 3.
Fig. 5 is a sectional view taken upon the line 5—5 of Fig. 4 looking in the direction of the arrows.
Figures 6, 7:
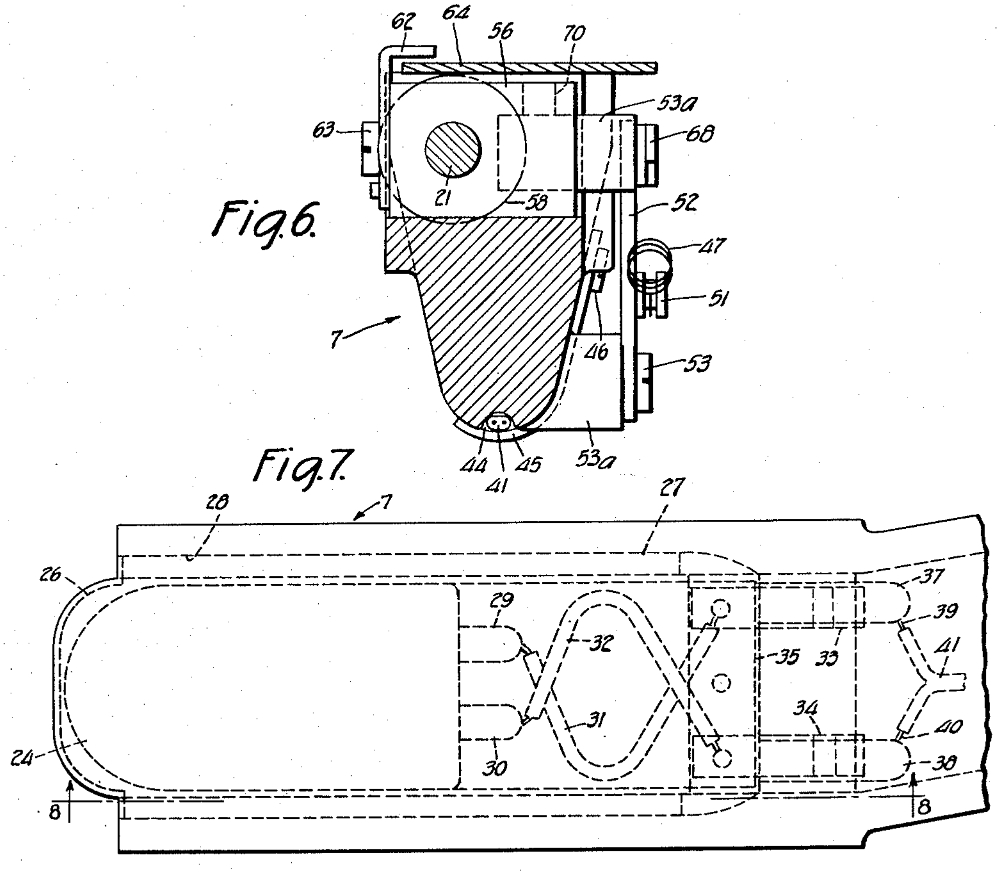
Fig. 6 is a sectional view taken upon the line 6—6 of Fig. 4 looking in the direction of the arrows.
Fig. 7 is an enlarged plan view of the outer end of the tone arm, having a translating cartridge contained therein.
Figure 8:
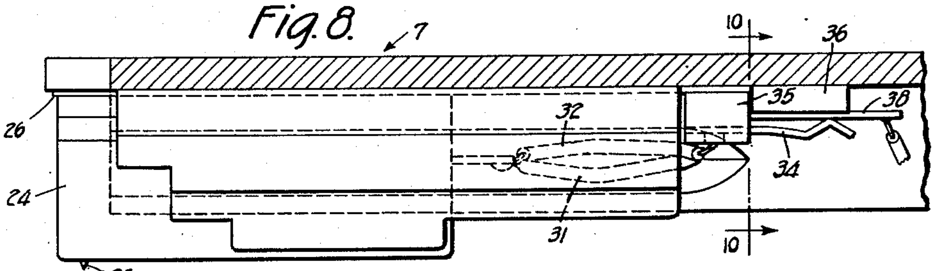
Fig. 8 is a fragmentary view in sectional elevation taken upon the line 8—8 of Fig. 7 looking in the direction of the arrows.
Figure 9:
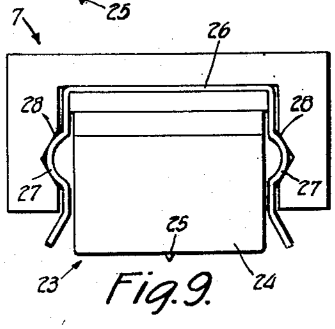
Fig. 9 is an end view of the structure illustrated in Figs. 7 and 8.
Figure 10:
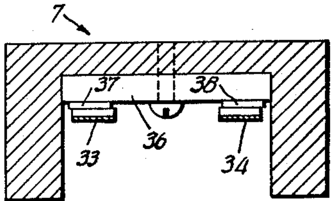
Fig. 10 is a sectional view taken upon the line 10—10 of Fig. 8 looking in the direction of the arrows.
Figures 11, 12, 13, 14:
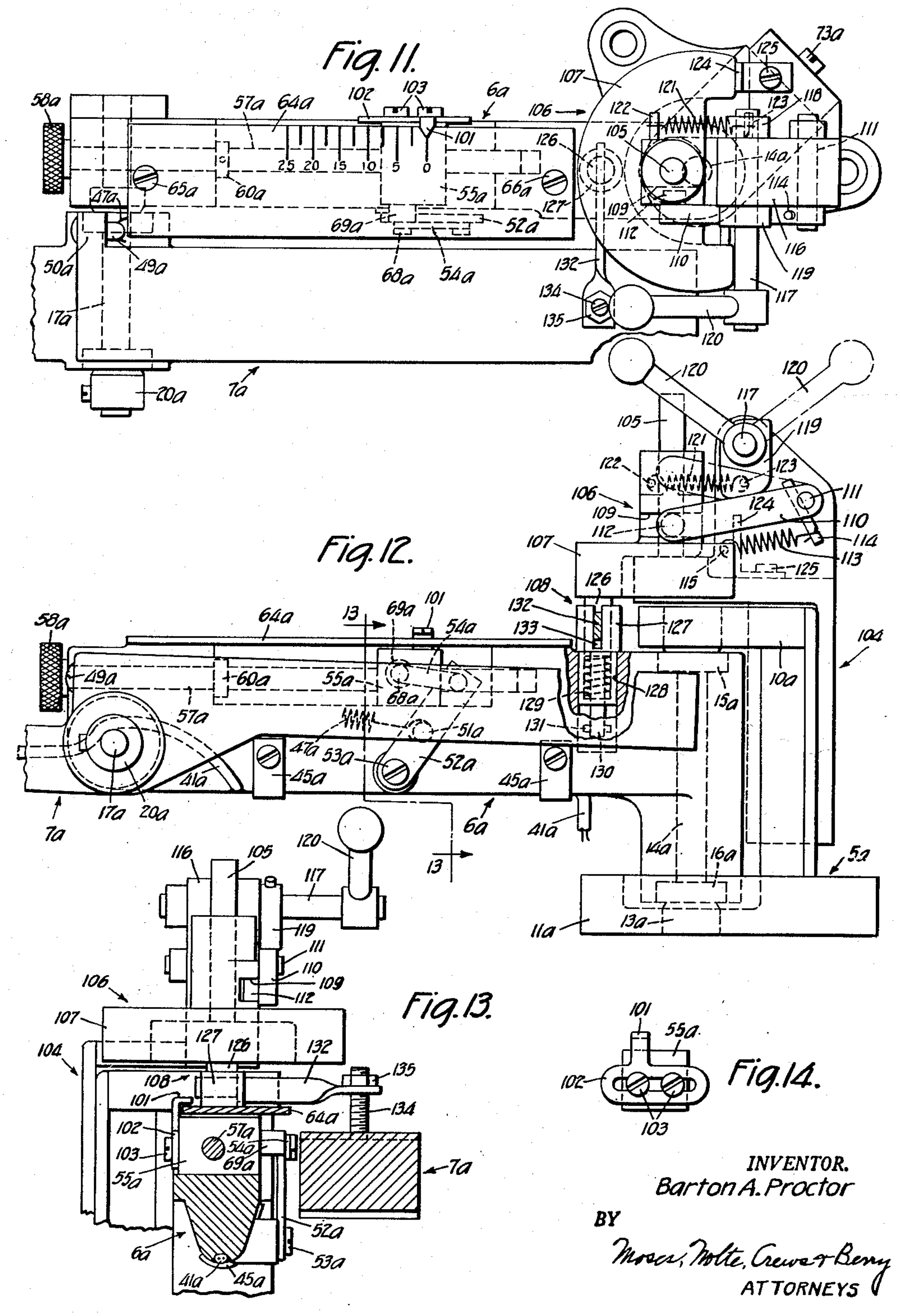
Fig. 11 is a view similar to Fig. 3 showing another embodiment of the invention.
Fig. 12 is a view similar to Fig. 4 showing the embodiment of Fig. 11.
Fig. 13 is a fragmentary vertical sectional view taken upon the line 13—13 of Fig. 12 looking in the direction of the arrows.
Fig. 14 is a detail view showing the adjustable mounting of the pointer.

When a cartridge has been put into place, the screw 57 is first operated to shift the pointer 26 to the zero position on the scale as illustrated in Figs. 1 and 3. The pointer 62 and its carrier block 55 will not shift from this position except in response to operation of the screw 57. In order to enable the tension of the spring 47 to be adjusted while the pointer and its carrier remain in this chosen fixed position, the connection of the lever 52 to the block 55 through the link 54 is not effected directly to the block 55, but instead is made to a pin 68 which is eccentrically carried upon a cylindrical rod 69 mounted in the block 55.

When the pointer has been set in zero position, the scale plate 64 is removed from the bracket 6 in order to gain access to a set screw 70 which is threaded through the block 55 into engagement with the rod 69 for holding the rod against rotation. The set screw is then partly backed out to release the rod 69, and the lever 52 is manually adjusted to a position in which the spring 47 exactly counterbalances the excess moment of the outer end of the arm 7. The set screw is then tightened to fix the rod 69 against rotation and thereby preserve the balancing adjustment. The scale plate 64 is reattached to the bracket 6 and the screw 57 is then operated to shift the pointer to the desired scale reading. The indicated pressure is automatically obtained so long as the pointer adjustment is not disturbed.

The arm 7 is provided with a lifting hook or finger piece 71x which can be used in lifting and lowering the arm when the recording density is relatively low, and in any case for shifting the arm to locate the stylus over a desired portion of the record.

An additional feature of the invention which may or may not be employed in conjunction with the features already described, depending upon the recording density, has to do with mechanism for mechanically lifting and lowering the tone arm to shift the stylus into and out of engagement with the record in a purely vertical direction. If the recording density is high, the feature can advantageously be utilized.

Upon the bracket 5 an auxiliary bracket 72 is secured by means of screws 73. The auxiliary bracket 72 includes a bearing portion 74 in which a pivot pin 75 is mounted. A bifurcated lever 76 has ears 77 mounted upon the pin 75 and secured to it. The lever 76 is urged upward by a spring 78 whose opposite ends are received in bores 79 and 80 which are formed, respectively, in the lever and in the bracket 72. The bracket 72 extends horizontally over the upper end of the bracket 10 into line with the vertical shaft 14.

The horizontally extending portion is forked and the arms 81 of the fork are turned upward and at their upper ends provide bearings for a pin 82. The pin 82 has affixed to it between the arms 81 a cam 83. A collar 84 is secured to the shaft 82 at one end thereof and has affixed to it an operating handle 85. The cam is designed to cooperate with a spring plate 86, which is secured upon the upper side of the lever 76. The lever 76 includes an end portion 87 of wide angular extent sufficient at least to cover the operative range of an abutment 89 which is secured to and extends upward from the inner end of the arm 7. As a matter of fact, the portion 87 of the lever 67 is adapted to cooperate with the abutment member 89 through a range of substantially 180°, and this is sufficient to enable the arm 7 to be shifted back and forth between records located side by side on separate spindles and to traverse said records without shifting the abutment member 89 out from under the portion 87 of the lever 76.

As the parts are shown in Fig. 4, the cam 83 is in its ineffective position, so that the inner end of the arm 7 is free to move upward and to permit the stylus to descend onto the record. The arm, however, is illustrated in Fig. 4 as in the balanced condition, the pointer 62 being at the zero reading on the scale. If the pointer were adjusted toward the left, the arm 7 would swing counter-clockwise from the position illustrated in Fig. 4 to the dot and dash position indicated in Fig. 2.

When it is desired to lift the stylus off the record, the handle 85 is simply shifted from the full line position of Fig. 4 to the dot and dash line position of the same figure, turning the cam, as shown, into position to depress the lever 76. The lever 76 in moving downward engages the abutment member 89 and thereby depresses the inner end of the arm 7, lifting the stylus directly off the record without any horizontal component of movement which would tend to mar the record and impair its playing qualities. The cam is so formed that it retains the dot and dash line position and, therefore, maintains the lever 76 in its depressed position.

When it is desired again to set the stylus down into engagement with the rotating record, the stylus is moved into position over the point on the record which it is desired to engage and the handle 85 is then slowly returned to the full line position illustrated in Fig. 4. This eases the stylus back onto the record without imparting any horizontal component of movement to it.

In order to keep the bracket 6 and the arm 7 from swinging freely in a horizontal direction when the stylus is disengaged from the record, a fiber pin 90 is mounted in a threaded bore 91 of the bracket 6. The pin 90 bears frictionally against the lower side of the lever 87 when the lever 87 is in its depressed condition, and thereby opposes swinging of the bracket. This is a yielding contact because the depressing force is transmitted to the lever 87 through the spring plate 86. The lower face of the lever 76 desirably extends horizontally, so that it will stand parallel to the direction of travel of the bracket 6 when the lever is in its depressed position.

The embodiment of Figs. 11 to 14, inclusive, is generally similar to that of Figs. 1 to 10, inclusive. No general description will, therefore, be given. Corresponding reference characters have been applied to corresponding parts with the subscript "*a*" added in each instance. The description will be confined substantially to the points in which the modified structure differs from that of Figs. 1 to 10.

Instead of providing an adjustable eccentric like 69 for connecting link **54*a* to block 55*a*, the rod 69*a* has the pin 68*a* disposed to project concentrically from it for connection to the link 54*a*. In place of the eccentric adjustment which is thus eliminated, provision is made for adjusting the pointer 101 relative to the block 55*a* by which it is carried. The pointer 101 includes a slotted portion 102 which bears against the side face of the block 55*a*. Two screws 103 are passed through the slot and threaded into the block 55*a* (see Fig. 14). When the knob 58*a* has been operated to bring the arm 7*a* into balance, the pointer 101 is adjusted relative to the block 55*a* to point at the zero mark on the scale plate 64*a*. The pointer is then fixed in position relative to the block 55*a* by tightening one or both of the screws 103**.

Instead of the auxiliary bracket 72 of Figs. 1 to 5, there is provided an auxiliary bracket 104 which is secured upon the bracket **5*a* by means of screws 73*a*. The auxiliary bracket 104 includes a portion which extends inward across the vertical pivot shaft 14*a*. The inner end of the bracket 104 carries an upwardly extending vertical guide rod 105**.

Upon the guide rod 104 there is slidingly mounted a depressible member 106 which is formed with a semicircular enlargement 107 at its lower end adapted to overlie a friction plunger pin 108 which is carried by the bracket **6*a***, throughout the operative range of movement of the plunger.

The member 106 has a horizontal slot 109 formed in one of its faces. A lever 110 secured to a pivoted rod 111, which is carried by the auxiliary bracket 104, carries an operating pin or roller 112 which plays in the groove 109. The lever 110 is urged in an upward direction by a tension coil spring 113 which is connected at one end to a pin 114 fixed in the lever 110 and at the other end to a pin 115 fixed on the auxiliary bracket 104.

The auxiliary bracket 104 includes an upstanding portion 116 in which a rock shaft 117 is mounted. The rock shaft 117 has a collar 118 secured to it at one side of the bracket member 116 and a cam 119 secured to it at the opposite side of said bracket member, the cam 119 being disposed to engage and cooperate with the lever 110. An operating handle 120 is made fast upon the shaft 117. When the handle is in the position illustrated in full lines in Fig. 12, the cam holds the lever depressed against the lifting action of the spring 113, and hence holds the member 106 depressed. When the handle 120 is shifted, however, to the position illustrated in dot and dash lines in Fig. 12, the spring 113 lifts the lever, and the lever in turn lifts the member 106 away from the pin 108.

The member 106 is held against turning by means of a tension coil spring 121 which is connected at one end to a pin 122 carried by the member 106 and at the other end to a pin 123 carried by the bracket member 116. The tendency of the spring 121 is to turn the member 106 in a clockwise direction, as the parts are viewed in Fig. 11, but such movement is limited and opposed by an angle bracket 124 which is secured to the auxiliary bracket 104 by means of a screw 125. The angle bracket 104 has a vertically extending face in engagement with the member 106, so that the member 106 is held against turning as it is raised and lowered.

The plunger 108 comprises a head portion 126 which is slidingly mounted in a cup 127. The cup 127 has a driven fit in a bore 128 of the bracket **6*a*. A compression coil spring 129 is contained within the lower end of the cup 127 and surrounds a stem portion 130 of the plunger 108. The spring 129 bears against the lower face of the plunger head 126 and urges the plunger upward. Upward movement of the plunger is limited by a cross pin 131 which is carried in the lower end of the stem 130 and is engageable with the lower face of the cup 127**.

A leaf 132 of metal extends through the head 126 of the plunger 108 and is fixedly secured to the head. Slots 133 are provided in the wall of the cup 127 to accommodate passage of the leaf 132 and guide it. The free end of the leaf 132 is twisted through a right-angle and has threaded through it a screw 134. The screw 134 is secured in adjusted position by lock nut 135. The screw 134 overlies the inner end of the arm **7*a*. It is carried downward by the plunger, when the member 106 acts to depress the plunger, into position to engage and depress the arm 7*a*** and thereby lift the stylus off the record.

The friction exerted by the member 106 against the plunger 108 is not sufficient to arrest the feeding of the stylus by the record. It is not objectionable, therefore, that the member 106 engages the plunger 108 before the stylus has been lifted away from the record. The friction exerted by the member 106 against the plunger 108 is, however, sufficient to guard against accidental horizontal shifting of the bracket **6*a* and the arm 7*a*** when these parts are otherwise free, and hence to assure that the stylus will be lowered vertically into engagement with the record.

I have described what I believe to be the best embodiments of my invention. I do not wish, however, to be confined to the embodiment shown, but what I desire to cover by Letters Patent is set forth in the appended claim.

I claim:

In a phonograph mechanism, in combination, a bracket pivoted for horizontal movement, an arm pivoted intermediate its ends on the bracket for vertical movement, said arm being adapted to carry at its outer end a translating device which includes a record engaging stylus, the inner end of the arm being depressible to lift the stylus out of engagement with the record, and mechanism for lifting the stylus directly away from the record comprising a stationary support and an arm depressing member mounted on the support, said member being guided for vertical movement by the support, a friction plunger carried by the bracket and guided for vertical movement therein for engagement with the depressing member, and a laterally extending arm-engaging member carried by the plunger.

References Cited in the file of this patent

UNITED STATES PATENTS

| Number | Name | Date |
|---|---|---|
| 474,946 | Clarke | May 17, 1892 |
| 1,299,768 | Ott | Apr. 8, 1919 |
| 2,060,117 | Proctor | Nov. 10, 1936 |
| 2,174,156 | Guedon | Sept. 26, 1939 |
| 2,236,599 | Hutter | Apr. 1, 1941 |
| 2,250,242 | Thompson | July 22, 1941 |
| 2,270,972 | Schneider | Jan. 27, 1942 |
| 2,277,699 | Guibert et al. | Mar. 31, 1942 |
| 2,318,627 | Proctor | May 11, 1943 |
| 2,354,558 | Thompson | July 25, 1944 |
| 2,417,114 | Kilham | Mar. 11, 1947 |
| 2,478,722 | Thompson | Aug. 9, 1949 |
| 2,506,665 | Giovannucci | May 9, 1950 |
| 2,537,214 | Di Ghilini | Jan. 9, 1951 |
| 2,551,506 | Rockwell | May 1, 1951 |

FOREIGN PATENTS

| Number | Country | Date |
|---|---|---|
| 44,417 | Austria | Oct. 10, 1910 |
| 178,277 | Switzerland | Sept. 16, 1935 |
| 532,028 | Great Britain | Jan. 16, 1941 |
| 215,710 | Switzerland | Oct. 1, 1941 |